United States Patent
Tanaka et al.

[19]

[11] Patent Number: 5,956,947
[45] Date of Patent: Sep. 28, 1999

[54] EXHAUST GAS PURIFYING METHOD AND APPARATUS FOR INTERNAL COMBUSTION ENGINE

[75] Inventors: Hiroshi Tanaka, Susono; Takaaki Itou, Mishima, both of Japan

[73] Assignee: Toyota Jidosha Kabushiki Kaisha, Toyota, Japan

[21] Appl. No.: 08/865,604

[22] Filed: May 29, 1997

[30] Foreign Application Priority Data

Jun. 3, 1996 [JP] Japan ................................ 8-140501

[51] Int. Cl.$^6$ ........................................................ F01N 3/00
[52] U.S. Cl. ............................ 60/297; 60/274; 60/278; 60/287
[58] Field of Search ................................ 60/297, 274, 278, 60/279, 287, 288, 292, 293, 301, 300, 303

[56] References Cited

U.S. PATENT DOCUMENTS

| | | |
|---|---|---|
| 4,934,142 | 6/1990 | Hayashi et al. . |
| 5,090,200 | 2/1992 | Arai ........................................... 60/286 |
| 5,355,672 | 10/1994 | Adamczyk, Jr. et al. . |
| 5,375,414 | 12/1994 | Adamczyk, Jr. et al. . |
| 5,388,405 | 2/1995 | Fujishita et al. . |
| 5,410,875 | 5/1995 | Tanaka et al. ............................ 60/288 |
| 5,524,433 | 6/1996 | Adamczyk, Jr. et al. ................ 60/276 |
| 5,647,206 | 7/1997 | Yamamoto et al. ....................... 60/297 |
| 5,738,832 | 4/1998 | Dogahara et al. ....................... 422/171 |

FOREIGN PATENT DOCUMENTS

| | | |
|---|---|---|
| 0593898 | 4/1994 | European Pat. Off. . |
| 62159714 | 7/1987 | Japan . |
| 62159715 | 7/1987 | Japan . |
| 4231616 | 8/1992 | Japan . |
| 5171929 | 7/1993 | Japan . |
| 633752 | 2/1994 | Japan . |
| 6173653 | 6/1994 | Japan . |

OTHER PUBLICATIONS

Patent Abstracts of Japan, vol. 017, No. 584 (M–1501), Oct. 25, 1993 & JP 05 171929 (Nissan Motor Co., Ltd.), Jul. 9, 1993.
Patent Abstracts of Japan, vol. 017, No. 686 (M–1529), Dec. 15, 1993 & JP 05 231134 (Hitachi, Ltd.), Sep. 7, 1993.
Patent Abstracts of Japan, vol. 018, No. 076 (M–1556), Feb. 8, 1994 & JP 05 288035 (Nissan Motor Co., Ltd.), Nov. 2, 1993.
Patent Abstracts of Japan, vol. 018, No. 613 (M–1709), Nov. 22, 1994 & JP 06 235320 (Nippondenso Co., Ltd.), Aug. 23, 1994.

*Primary Examiner*—F. Daniel Lopez
*Assistant Examiner*—Binh Tran
*Attorney, Agent, or Firm*—Kenyon & Kenyon

[57] ABSTRACT

An adsorbent may be positively regenerate by a technique to remove adhered materials such as soot adhered to the adsorbent so that the durability of the adsorbent is enhanced. To meet this, an exhaust gas purifying apparatus for an internal combustion engine, comprises a path switcher for introducing exhaust gas from the internal combustion engine into at least one of a first exhaust gas path and a second exhaust gas path branched downstream of catalysts, an adsorbent disposed in the first exhaust gas path for adsorbing unburnt gas components contained in the exhaust gas, a recirculating device for recirculating the unburnt gas components separated from the adsorbent to an upstream side of the catalysts, and a temperature elevator for elevating a temperature of the adsorbent after the unburnt gas components separated from the adsorbent has been recirculated by the recirculating device.

5 Claims, 10 Drawing Sheets

EXHAUST GAS PURIFYING METHOD AND APPARATUS FOR INTERNAL COMBUSTION ENGINE

BACKGROUND OF THE INVENTION

1. Field of the Invention

The present invention relates to an exhaust gas purifying method and apparatus for purifying exhaust gas emitted from an internal combustion engine.

2. Description of the Related Art

In an automotive internal combustion engine or the like, it is required to purify the components of exhaust gas, such as carbon monoxide (CO), nitrogen oxide (NOx), and hydrocarbon (HC) before their emission to the atmosphere.

To meet such a requirement, an exhaust gas purifying apparatus for an internal combustion engine disclosed in Japanese Patent Application Laid-Open No. Hei 5-171929 is known. In this exhaust gas purifying apparatus, there is provided an exhaust system in which an exhaust pipe downstream of a catalyst is branched into a first branch flow path and a second branch flow path and these branch flow paths are again merged into a single flow on the downstream side. Then, an adsorbent for adsorbing the hydrocarbon is provided in the first branch flow path, and an exhaust gas recirculation path is provided downstream of the adsorbent for introducing a part of the exhaust gas to the intake side of the internal combustion engine.

Then, in the exhaust gas purifying apparatus, in the case where the catalyst is kept under non-active conditions as in the case where the internal combustion engine is started in a cold condition, the exhaust gas from the internal combustion engine is caused to flow from the catalyst to the first branch flow path and to a muffler through the adsorbent until the catalyst is activated. Thus, the hydrocarbon (HC) contained in the exhaust gas is adsorbed to the adsorbent.

Thereafter, when the catalyst is heated by the heat of the exhaust gas and the temperature of the catalyst reaches the activation temperature, the exhaust gas purifying apparatus renders the exhaust gas, which has been purified by the catalyst, to flow through both first branch flow path and second branch flow path so that the exhaust gas, which has been introduced in the first branch flow path, may flow through the adsorbent to the exhaust gas recirculation flow path and the exhaust gas, which has been introduced into the second branch flow path, may flow to the muffler.

In this case, the exhaust gas introduced into the first branch flow path causes the adsorbent to be heated and removes therefrom the hydrocarbon (HC) adsorbed to the adsorbent. The hydrocarbon (HC) separated from the adsorbent is introduced into the exhaust gas recirculation flow path together with the exhaust gas and recirculated to the intake side of the internal combustion engine.

By the way, not only the hydrocarbon (HC) but also adhered materials such as soot which have passed the catalyst are adhered to the adsorbent. Also, the internal combustion engine is at a standstill before the separation of the hydrocarbon (HC) from the adsorbent has been completed, the hydrocarbon (HC) is kept adsorbed to the adsorbent. Then, in the next start of the internal combustion engine, if an engine RPM is increased immediately after the start, since the high temperature exhaust gas passes through the adsorbent, a part of the hydrocarbon (HC) adsorbed to the adsorbent becomes soot and again adheres to the adsorbent.

The adhered material thus adhered to the adsorbent causes that the adsorbing performance is degraded. It is therefore necessary to remove the adhered material away from the adsorbent. However, in the above-described exhaust gas purifying apparatus, since the adsorbent is heated by the low flow rate such as the exhaust gas recirculation, it is difficult to heat the adsorbent up to a temperature range in which the adhered materials such as soot may be removed from the adsorbent.

SUMMARY OF THE INVENTION

In view of the above-noted defects, an object of the present invention is to provide a technique for removing adhered materials such as soot adhered to an adsorbent to thereby enhance a regeneration rate of the adsorbent to enhance a durability of the adsorbent.

In order to accomplish this and other objects, the following structures are used.

Namely, an exhaust gas purifying apparatus for an internal combustion engine according to the present invention, comprises: a path switching means for introducing exhaust gas from the internal combustion engine into at least one of a first exhaust gas path and a second exhaust gas path branched downstream of catalysts; an adsorbing means disposed in said first exhaust gas path for adsorbing unburnt gas components contained in the exhaust gas; a recirculating means for recirculating the unburnt gas components separated from said adsorbing means to an upstream side of the catalysts; and a temperature elevating means for elevating a temperature of said adsorbing means after the unburnt gas components separated from said adsorbing means has been recirculated by said recirculating means.

In the thus constructed exhaust gas purifying apparatus for an internal combustion engine, when the catalysts are in the non-activated condition as in the cold start of the internal combustion engine, the first exhaust gas path is opened and at the same time the second exhaust gas path is closed by the path switching means so that the exhaust gas from the catalysts is caused to flow into the first exhaust gas path. In this case, the unburnt gas components contained in the exhaust gas introduced into the first exhaust gas path is adsorbed by the adsorbing means.

Then, when the catalysts are activated, the path switching means causes a major part of the exhaust gas to flow into the second exhaust gas path and the rest to flow into the first exhaust flow path. At the same time, the recirculating means recirculates a part of the exhaust gas introduced into the first exhaust gas path to the upstream side of the catalysts. In this case, the exhaust gas introduced into the first exhaust gas path is recirculated to the upstream side of the catalysts together with the unburnt gas components separated from the adsorbing means. However, in the temperature range where the unburnt gas components is separated, it is impossible to remove the materials adhered to the adsorbing means. Accordingly, the temperature elevating means in accordance with the present invention makes, after the recirculation of the unburnt gas components separated from the adsorbing means has been completed by the recirculating means, the temperature of the adsorbing means rise. As a result, the materials adhered to the adsorbing means are heated in accordance with the temperature rise of the adsorbing means. Then, the adhered materials reach the combustible temperature by the heating and are burnt.

In this case, the temperature elevating means may comprise:

an air/fuel ratio discriminating portion for discriminating whether or not an air/fuel ratio of the exhaust gas from the internal combustion engine is higher than a stoichiometric air/fuel ratio; and a controlling portion for controlling said path switching means so that the exhaust gas from the catalysts into said first exhaust gas path when the air/fuel ratio discriminating portion judges that the air/fuel ratio of the exhaust gas is higher than the stoichiometric air/fuel ratio.

In this case, the air/fuel discriminating portion supervises the air/fuel ratio of the exhaust gas and judges that the air/fuel ratio of the exhaust gas is higher than the stoichiometric ratio (in the lean condition), it notifies the controlling portion of the fact. The controlling portion receiving the notification controls the path switching means to open the first exhaust gas path and simultaneously to-close the second exhaust gas path so as to cause the exhaust gas from the catalysts to flow into the first exhaust gas path.

As a result, the exhaust gas which flows into the first exhaust gas path has a high oxygen concentration. Then, the adsorbing means is subjected to heat of the exhaust gas so that its temperature rises. At the same time, the materials adhered to the adsorbing means are heated. When the adhered materials reach the combustible temperature by the heating, the combustion is accelerated by the oxygen contained in the exhaust gas. The burnt adhered materials are removed from the adsorbing means together with the exhaust gas.

The temperature elevating means may comprises: a secondary air supply portion for mixing secondary air with the exhaust gas from the internal combustion engine; and a controlling portion for controlling said path switching means so that the exhaust gas mixed with the secondary air is introduced into said first exhaust gas path.

In this case, after the completion of the recirculation of the unburnt gas components, the secondary air supply portion supplies the exhaust gas from the internal combustion engine with the secondary air. At this time, the exhaust gas has a high oxygen concentration. Then, the controlling portion controls the path switching means to open the first exhaust path and simultaneously to close the second exhaust path so as to cause the exhaust gas from the catalysts to flow into the first exhaust gas path.

As a result, the adsorbing means receives the heat of the exhaust gas and its temperature rises, so that the materials adhered to the adsorbing means is heated. When the adhered materials reach the combustible temperature by the heating, the combustion is accelerated by the oxygen contained in the exhaust gas. The burnt adhered materials are removed from the adsorbing means together with the exhaust gas.

Furthermore, the temperature elevating means may comprise a heating portion for heating said adsorbing means. In this case, after the completion of the recirculation of the unburnt gas components, the heating portion heats the adsorbing means. Then, in accordance with the temperature rise of the adsorbing means, the materials adhered thereto are heated, and the adhered materials reach the combustible temperature by the heating and are burnt.

According to the present invention, after the completion of the recirculation of the unburnt gas components separated from the adsorbing means, the temperature of the adsorbing means rises so that the materials adhered to the adsorbing means are heated up to its combustible temperature and are burnt. In this case, the combustion is accelerated if the exhaust gas having a high oxygen concentration is caused to flow into the adsorbing means.

Accordingly, according to the present invention, since it is possible to remove not only the unburnt gas components adsorbed to the adsorbing means but also the materials adhered thereto, the adsorbing means may be positively regenerated and the durability of the adsorbing means may be enhanced.

Also, an exhaust gas purifying method for an internal combustion engine according to the present invention, comprising the following steps of: introducing exhaust gas from the internal combustion engine into at least one of two exhaust gas paths branched downstream of catalysts; adsorbing unburnt gas components contained in the exhaust gas by an adsorbing means disposed in at least one of said exhaust gas paths; recirculating the unburnt gas components separated from said adsorbing means to an upstream side of said catalysts; and elevating a temperature of said adsorbing means to a temperature higher than a separation temperature for the unburnt gas components after the unburnt gas components separated from said adsorbing means has been recirculated.

In the thus constructed exhaust gas purifying method for an internal combustion engine, when the catalysts are in a non-activated condition as in the case where the internal combustion engine is started in the cold condition, the exhaust gas from the catalysts is introduced into one of the two exhaust gas path, provided with the adsorbing means. In this case, the unburnt gas components contained in the exhaust gas is adsorbed to the adsorbing means.

Then, when the catalysts are activated, a major part of the exhaust gas is introduced into the other exhaust gas path where the adsorbing means is not provided, and at the same time, the rest of the exhaust gas is introduced into the exhaust gas path where the adsorbing means is provided. Furthermore, a part of the exhaust gas introduced into the latter exhaust gas path is recirculated to an upstream side of the catalysts.

The exhaust gas introduced into one of the exhaust gas paths is recirculated to the upstream side together with the unburnt gas components separated from the adsorbent means. In the temperature range where the unburnt gas components is separated, it is impossible to remove the materials adhered to the adsorbing means. Accordingly, in accordance with the present invention, after the recirculation of the unburnt gas components separated from the adsorbing means has been completed, the temperature of the adsorbing means rises. In this case, the materials adhered to the adsorbing means are heated in accordance with the temperature rise of the adsorbing means. Then, the adhered materials reach the combustible temperature by the heating and are burnt.

DESCRIPTION OF THE PREFERRED EMBODIMENTS

Embodiment 1

An exhaust purifying apparatus for an internal combustion engine according to the present invention will now be described with reference to the accompanying drawings.

The exhaust gas purifying apparatus for an internal combustion engine according to the present invention is realized by an automotive exhaust system and a controller system for controlling the exhaust system.

The automotive exhaust system for a vehicle will now be described.

Figure 1:
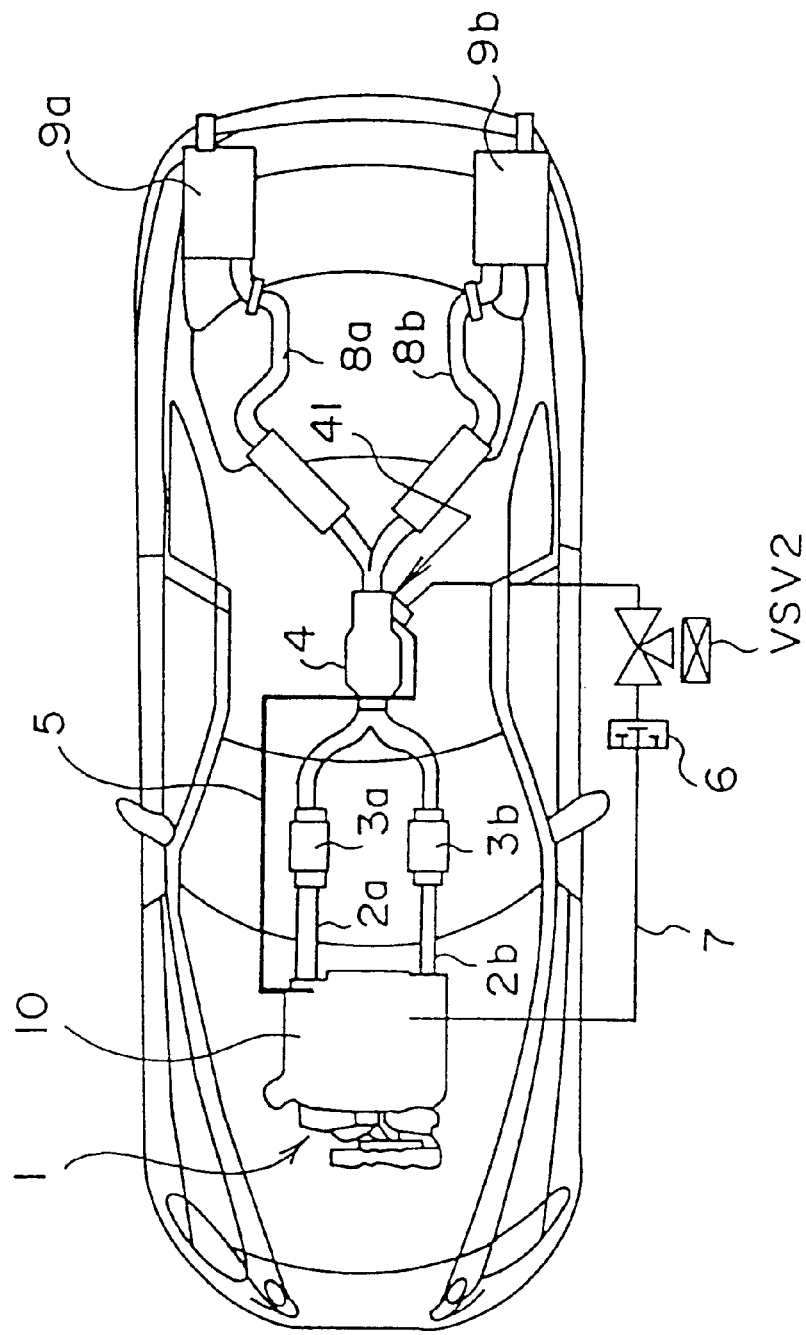
FIG. 1 is a schematic structure view showing an exhaust gas system of an automotive vehicle to which an exhaust gas purifying apparatus for an internal combustion engine according to the present invention is applied.

FIG. 1 is a schematic view showing the automotive exhaust system to which the exhaust gas purifying apparatus for an internal combustion engine according to the present invention is applied. As shown in FIG. 1, in the exhaust system, after two exhaust pipes 2a and 2b connected to an engine 1 are once emerged into a single pipe, the exhaust pipes are again separated into two exhaust pipes 8a and 8b. Each of the exhaust pipes 8a and 8b is connected to a muffler 9a, 9b located in the rear side of the chassis. Furthermore, catalysts 3a and 3b for purifying the exhaust gas are provided in the two exhaust gas pipes 2a and 2b, respectively. An adsorbent sleeve 4 is provided at a portion in which the exhaust pipes 2a and 2b are merged into one downstream of the catalysts 3a and 3b.

Figure 2:
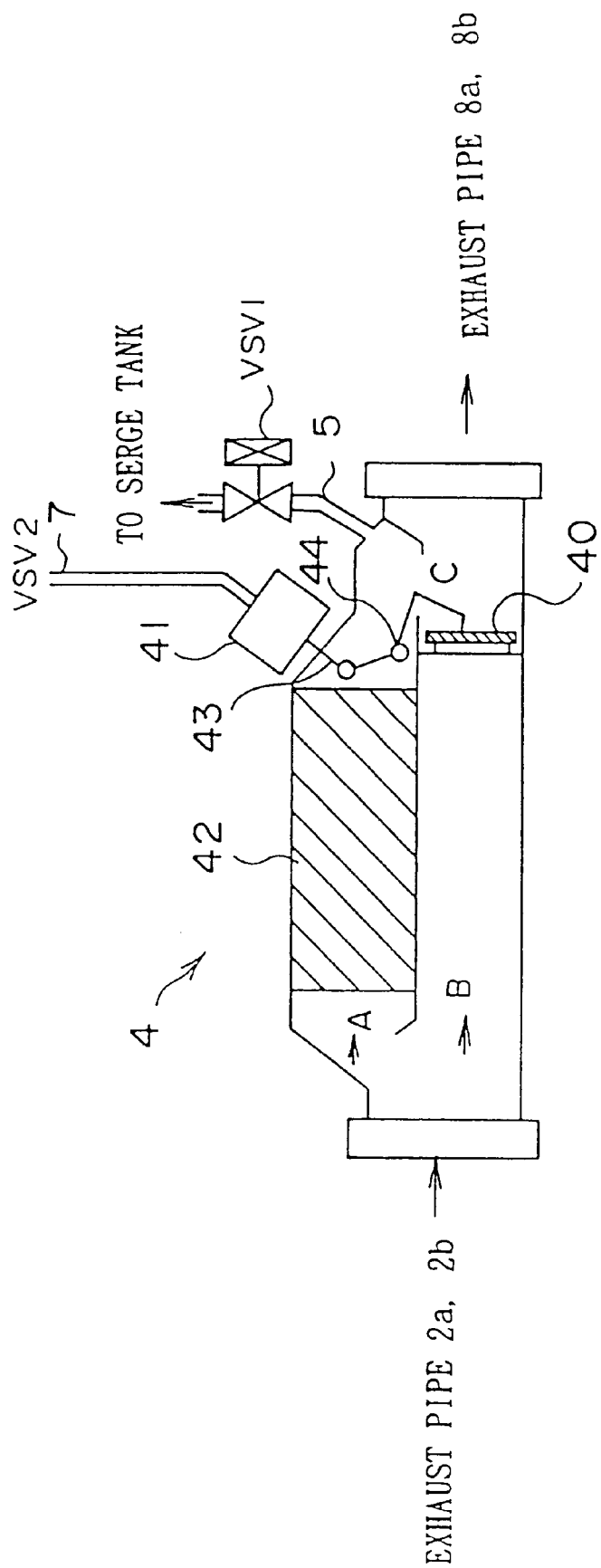
FIG. 2 is a cross-sectional view showing an internal structure of an adsorbent sleeve.

The interior of the adsorbent sleeve 4 is divided into two flow paths. The adsorbent for adsorbing hydrocarbon (HC) is provided in one of the flow paths. More specifically, as shown in FIG. 2, the interior of the adsorbent sleeve 4 is divided into two flow paths A and B. These flow paths A and B correspond to the first gas exhaust flow path and the second exhaust gas flow path according to the present invention, respectively.

For instance, a zeolite system adsorbent 42 is provided in the flow path A as the adsorbent of the present invention. The adsorbent 42 adsorbs the hydrocarbon (HC) contained in the exhaust gas. A recirculation pipe 5 whose one end is connected to a serge tank 10 provided in the intake pipe of the engine 1 is connected at the other end downstream of the adsorbent 42 in the flow path A. A first vacuum switching valve VSV1 for opening the recirculation pipe 5 when a current is applied thereto and for closing the recirculation pipe 5 when a current is not applied thereto is mounted in a midway of the recirculation pipe 5. The recirculation pipe 5 and the first vacuum switching valve VSV1 correspond to the recirculation means according to the present invention. Incidentally, in accordance with the embodiment of the invention, the first switching valve VSV1 and the recirculation pipe 5 may serve as a well known exhaust gas recirculation device (EGR).

Also, a bypass valve 40 for selectively opening/closing the flow path A and the flow path B is mounted in the outlet portion C of the adsorbent sleeve 4. The bypass valve 40 is connected through a lever 43 and a diaphragm chamber 41 mounted outside the adsorbent sleeve 4. The lever 43 rotates about a fulcrum 44. When the end of the lever 43 on the side of the diaphragm chamber 41 is lowered, the bypass valve 40 is lifted by the end portion of the lever 43 on the side of the bypass valve 40. As a result, the flow path B is opened and the flow path A is closed. On the other hand, when the end of the lever 43 on the side of the diaphragm chamber 41 is lifted, the bypass valve 40 is lowered by the end portion of the lever 43 on the side of the bypass valve 40. As a result, the flow path A is opened and the flow path B is closed.

In this case, as shown in FIG. 1, a pipe 7 whose one end is connected to an intake pipe (not shown) of the engine is connected at the other end to the above-described diaphragm chamber 41 so that a negative pressure within the intake pipe may be introduced to the engine. In the midway of the pipe 7, there are connected a check valve 6 for allowing only the negative pressure to be applied from intake pipe side to the diaphragm chamber side, and a second vacuum switching valve VSV2 for opening the pipe 7 when a current is supplied thereto and for closing the pipe 7 when a current is not supplied thereto. If no electric power is supplied to the second vacuum switching valve VSV2 (during non-electric power supply), the second vacuum switching valve VSV2 closes the pipe 7, so that the negative pressure to the diaphragm chamber 41 is interrupted and the diaphragm chamber 41 is released to the atmosphere. In this case, the end portion of the lever 43 on the side of the diaphragm chamber 41 is lowered by the spring force of the diaphragm. As a result, the end portion of the lever 43 on the bypass valve 40 lifts the bypass valve 40. In this case, the bypass valve 40 closes the flow path A and opens the flow path B. On the other hand, if an electric power is supplied to the second vacuum switching valve VSV2 (during electric power supply), the second vacuum switching valve VSV2 opens the pipe 7, so that the negative pressure is applied to the diaphragm chamber 41. In this case, the diaphragm chamber 41 lifts the end portion of the lever 43 on the side of the diaphragm chamber 41. When the end portion of the lever 43 on the diaphragm chamber 41 is lifted, the lever 43 is rotated about the furculum 44, and the end portion of the lever 43 on the side of the bypass valve 40 lowers the bypass valve. The bypass valve 40 opens the flow path A and closes the flow path B.

The above-described bypass valve 40, diaphragm chamber 41 and second vacuum switching valve VSV2 realize the passage switching means according to the present invention.

Figure 3:
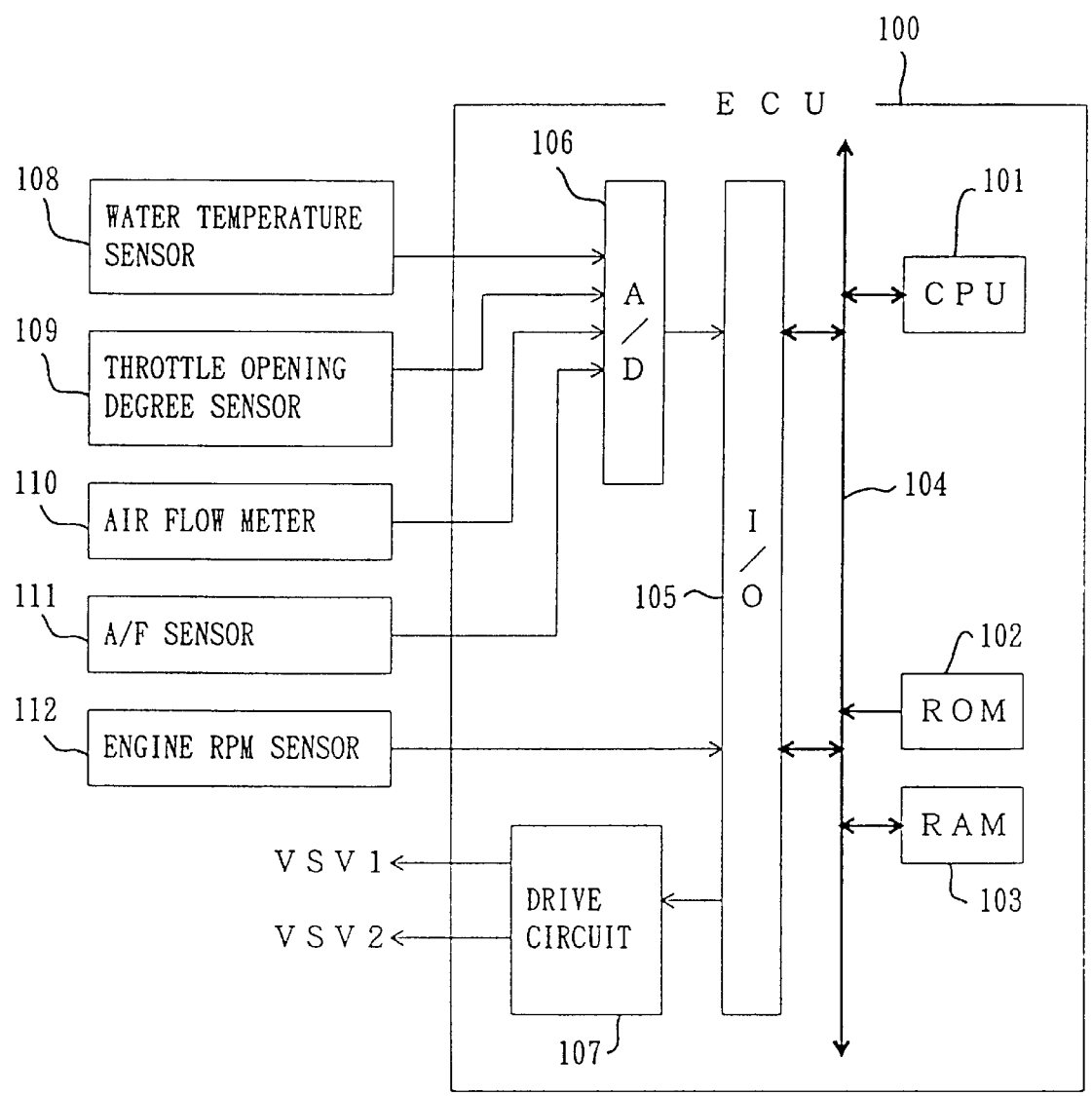
FIG. 3 is a schematic structure view showing a control system of an automotive vehicle to which an exhaust gas purifying apparatus for an internal combustion engine according to the present invention is applied.

Subsequently, the controller system for controlling the above-described exhaust system will be described with reference to FIG. 3. The controller system includes a water temperature sensor 108, a throttle opening degree sensor 109, an air flow meter 110, an air/fuel ratio sensor 111, and an engine RPM sensor 112 each of which is connected to an electronic control unit (ECU) 100.

The water temperature sensor 108 detects a temperature of cooling water for the engine 1.

The throttle opening degree 109 outputs a voltage in proportion to the opening degree of the throttle valve provided in the intake pipe of the engine 1.

The air flow meter 110 outputs a voltage in proportion to an amount of air sucked to the engine 1.

The air/fuel ratio sensor 111 realizes the discriminating portion for the air/fuel ratio according to the present invention, and mounted on the exhaust pipe 2a (or 2b) upstream of the catalyst 3a, 3b for outputting a voltage corresponding to a concentration of oxygen residing in the exhaust gas from the engine 1.

The engine RPM sensor 112 detects the RPM of the internal combustion engine for detecting the RPM per unit time of a crankshaft of the engine 1.

The ECU 100 controls the above-described exhaust system on the basis of the signals from the respective sensors, and is provided with CPU 101, ROM 102, RAM 103 and input/output (I/O) port 105. These are connected through bus 104. A drive circuit 107 and an A/D converter 106 are connected to the input port (I/O) 105. Incidentally, the ECU 100 may serve as ECU for controlling fuel injection control or may be ECU specialized for the exhaust gas purifying apparatus.

The above-described ROM 102 stores therein various control maps and application programs to be executed by the CPU 101. For example, the control maps of the ROM 102 are functions representative of the relationship between a temperature of engine cooling water when the engine is started and a period of time until the catalysts 3a and 3b are activated (catalyst activation time). When the temperature of the engine cooling water upon the engine start is specified, the catalyst activation time corresponding to this is determined as one value. Also, another control map is a function representative of a relationship between a temperature of the cooling water upon the engine start and an amount of accumulated suction air for judgement. The amount of accumulated suction air for judgement means an amount of air to be expected to be sucked by the engine 1 during a period of time from the engine start to the temperature elevated condition where the temperature of the adsorbent 42 rises to a predetermined temperature (at which the hydrocarbon (HC) adsorbed to the adsorbent 42 is completely separated).

The CPU 101 executes the application program of the ROM 102 so that it outputs the control signal to the first vacuum switching valve VSV1 and the second vacuum switching valve VSV2.

The RAM 103 stores therein the signals from the water temperature sensor 108, the throttle opening degree sensor 109, the air flow meter 110, the air/fuel ratio sensor 111 and the engine RPM sensor 112 and the calculation result of the CPU 101. Also, the RAM 103 has a region for registering a flag (engine start flag) for discriminating whether or not the engine 1 is started. The engine start flag is set and reset by the CPU 101. For example, the CPU 101 monitors the output from the engine RPM sensor 112, sets the engine start flag when the output exceeds the threshold value, and resets the engine start flag when the output is equal to or lower than the threshold value.

The A/D converter 106 converts the output signals from the water temperature sensor 108, the throttle opening degree sensor 109, the air flow meter 110 and the air/fuel ratio sensor 111 from the analog signals into the digital signals and inputs the converted signals into the I/O port 105.

The drive circuit 107 is connected to the first vacuum switching valve VSV1 of the recirculation pipe 5 and the second vacuum switching valve VSV2 of the pipe 7. Then, the drive circuit 107 supplies the first vacuum switching valve VSV1 or the second vacuum switching valve VSV2 with electric power in accordance with the control signal outputted from the CPU 101.

The operation of the foregoing embodiment of the invention will now be described.

Figure 4:
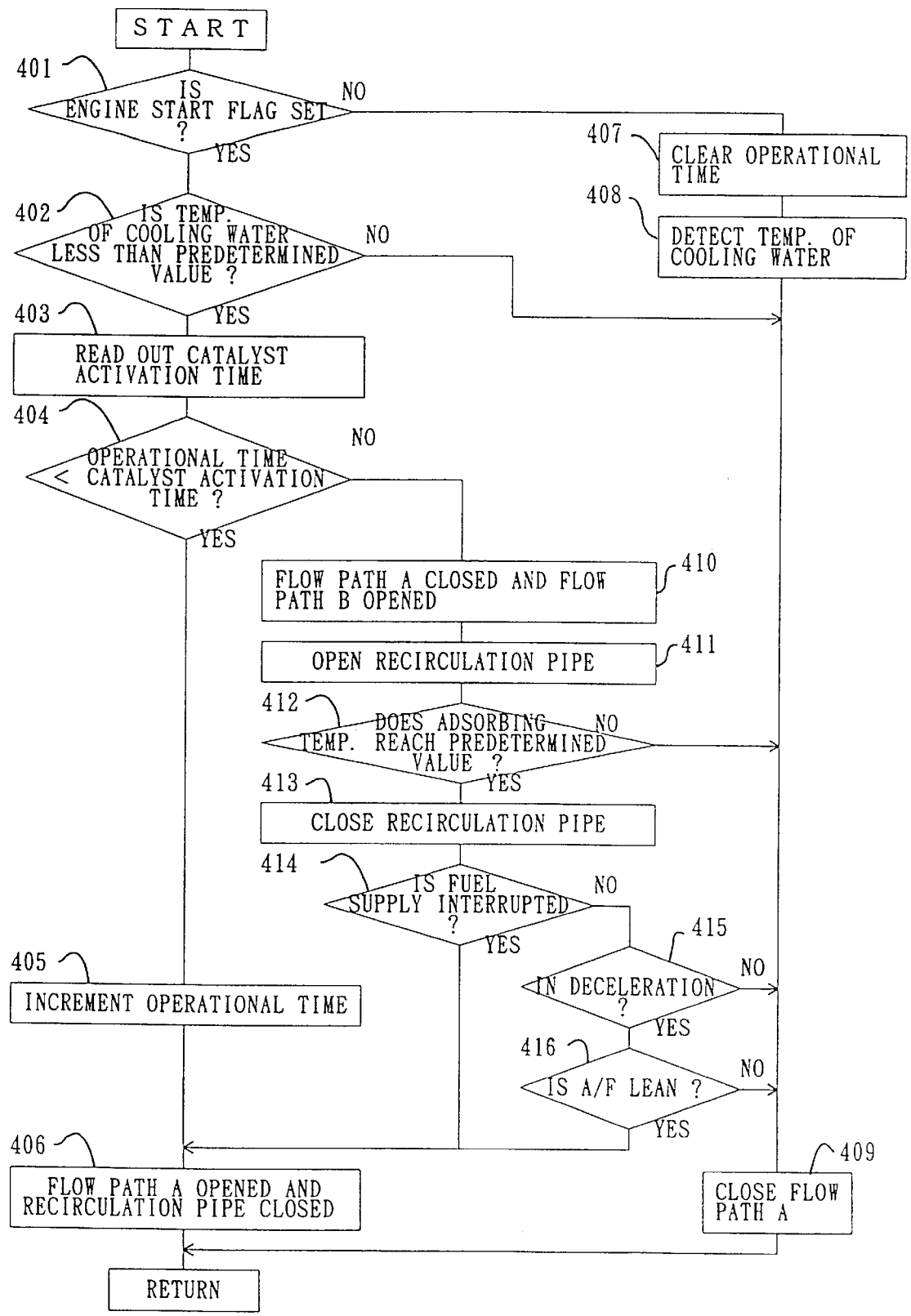
FIG. 4 is a flowchart showing an example of an exhaust gas purifying process routine.

FIG. 4 shows an exhaust gas purifying process routine to be executed by the CPU 101 of the ECU 100, which is repeatedly executed for a constant period of time (for example, 160 msec.).

When the exhaust gas purifying process routine is driven when the engine 1 is kept at a standstill, the CPU 101 accesses the RAM 103 to judge that the engine start flag is not set (step 401). Then, the CPU 101 resets the operation time for the engine 1 (step 407), and writes the temperature of the cooling water detected by the water temperature sensor 108 to the RAM 103 (step 408). In this case, the CPU 101 does not supply the second vacuum switching valve VSV2 from the drive circuit 107 with electric power but keeps the flow path A in the closed condition (step 409).

When the exhaust gas purifying process routine is started after the start of the engine, the CPU 101 judges that the engine start flag is set in step 401, reads out the temperature of the cooling water while accessing the RAM 103, and discriminates whether or not the temperature is lower than the predetermined value (step 402).

In the step 402, if the temperature of the engine cooling water is lower than the predetermined value, the CPU 101 accesses the control map of the ROM 102 and reads out the catalyst activation time corresponding to the temperature of the engine cooling water (step 403).

Subsequently, the CPU 101 compares the catalyst activation time read out from the ROM 102 with the operation time from the engine start to the current time (step 404). In this case, if the operation time is shorter than the catalyst activation time, the CPU 101 increments the operation time (step 405). The operation time is incremented by the above-described time (for example, 16 msec) as a unit. The CPU 101 supplies only the second vacuum switching valve VSV2 from the drive circuit 107 with electric power. The second vacuum switching valve VSV2 subjected to the electric power opens the flow path A, and also closes the flow path B within the adsorbent sleeve 4. On the other hand, since the first vacuum switching valve VSV1 is not subjected to the drive power, the valve continues to close the recirculation pipe 5.

Figure 5:
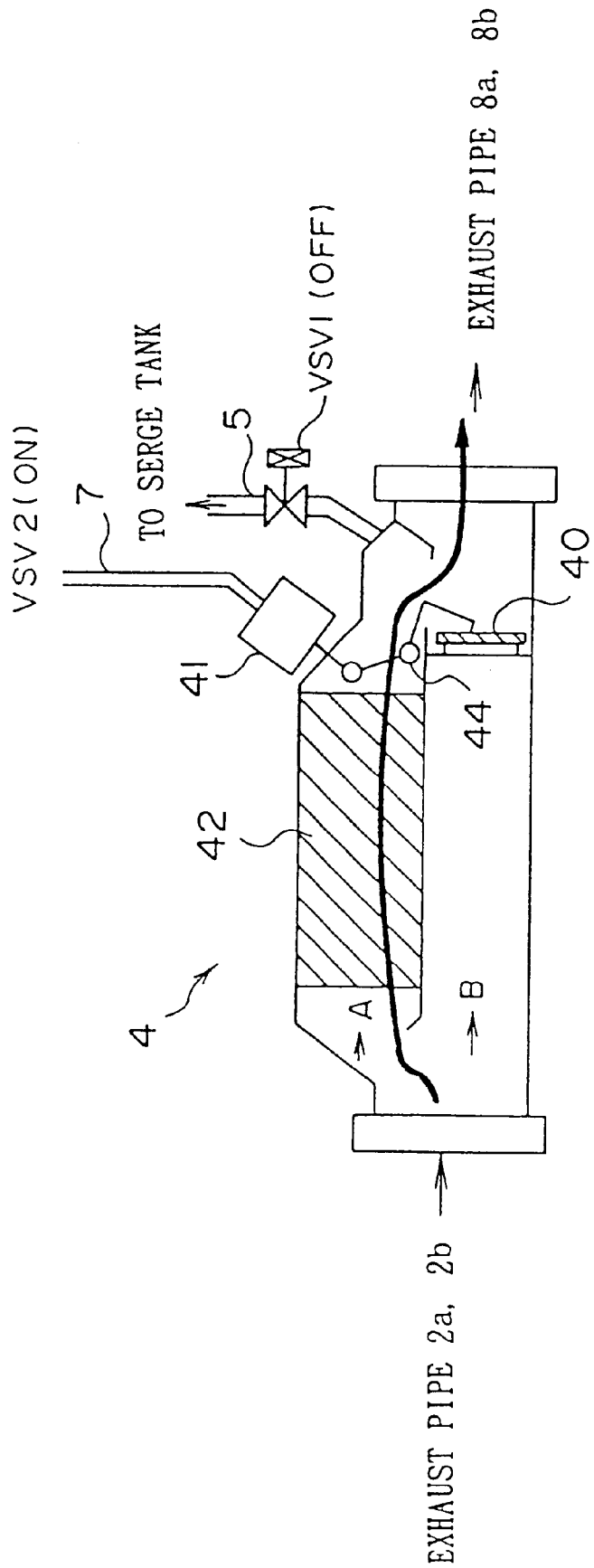
FIG. 5 is a view (1) showing a flow of the exhaust gas within the adsorbent sleeve.

The above-described steps 403 to 406 show the operation of the exhaust gas purifying apparatus under the condition that the engine 1 is cold, i.e., the catalysts 3a and 3b are not activated. As a result, as shown in FIG. 5, all the exhaust gas discharged from the catalysts 3a and 3b is discharged to the exhaust pipes 8a and 8b located downstream thereof through the flow path A within the adsorbent sleeve 4. The hydrocarbon (HC) that has not been oxidized by the catalysts 3a and 3b is adsorbed to the adsorbent 42 within the adsorbent sleeve 4.

Figure 6:
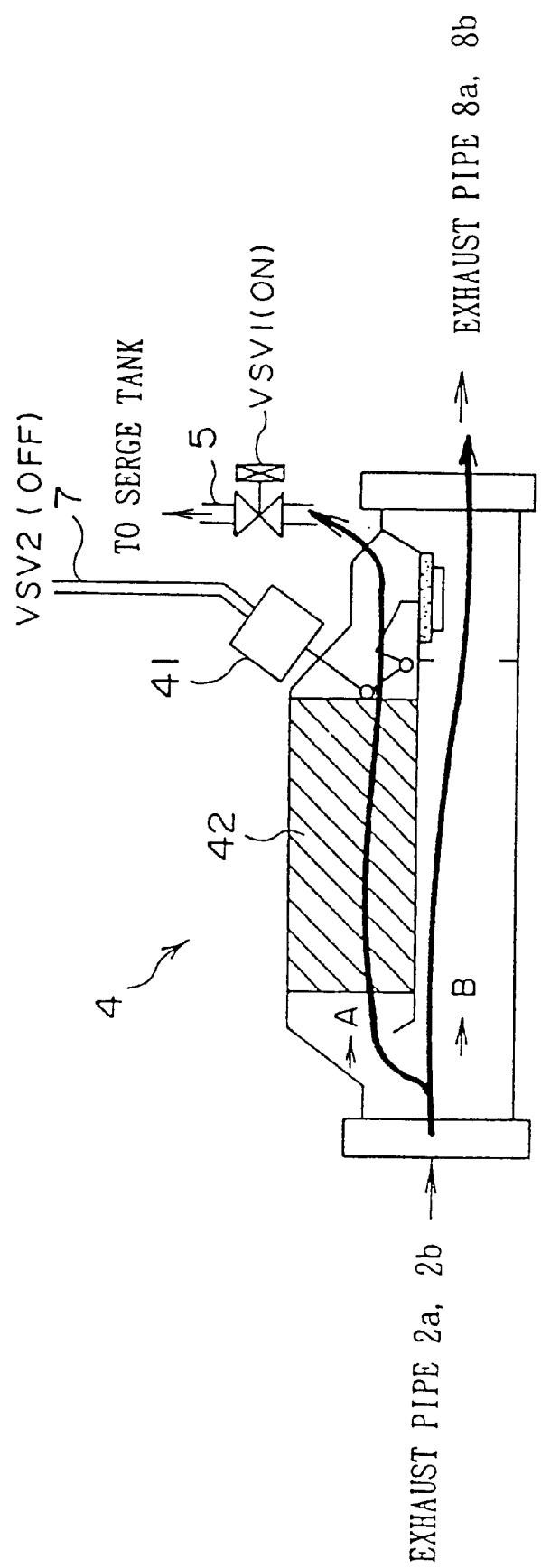
FIG. 6 is a view (2) showing a flow of the exhaust gas within the adsorbent sleeve.

Then, as the CPU 101 continues to repeatedly execute the routine shown in FIG. 4 for every constant time period, the operation time of the engine 1 becomes the catalyst activation time or more. At this time, the CPU 101 judges that the operation time has become the catalyst activation time or more. Then, the CPU 101 stops the power supply to the second vacuum switching valve VSV2 from the drive circuit 107 and starts the power supply to the first vacuum switching valve VSV1 from the drive circuit 107. The second vacuum switching valve VSV2 to which no power supply is effected closes the flow path A and opens the flow path B (step 410). On the other hand, the first vacuum switching valve VSV1 to which the power is supplied opens the recirculation pipe 5 (step 411). Major part of the exhaust gas that has been purified by the activated catalysts 3a and 3b is discharged to the exhaust pipes 8a and 8b located downstream thereof through the flow path B within the adsorbent sleeve as shown in FIG. 6. The rest of the exhaust gas is caused to pass through the flow path A and is introduced into the recirculation pipe 5. The exhaust gas which passes through the flow path A heats the adsorbent 42. The temperature rise of the adsorbent 42 causes the hydrocarbon (HC) adsorbent thereto to be separated from the adsorbent 42. The separated hydrocarbon (HC) is introduced into the recirculation pipe 5 together with the exhaust gas passing through the flow path A and is recirculated to the intake pipe of the engine 1.

Also, the CPU 101 accumulates the output signal of the air flow meter 110 and calculates the accumulated suction air amount that is an amount of air to be sucked by the engine 1 from the start of the engine till the current point. However, the CPU 101 accesses the control map of the ROM 102 upon the start of the engine 1, reads out the accumulated suction air amount for judgement corresponding to the temperature of the engine cooling water and writes the accumulated suction air amount for judgement in the RAM 103. When the CPU 101 completes the process of the above-described step 411, the CPU 101 compares the accumulated suction air amount with the accumulated suction air amount for judgement registered in RAM 103, and discriminates whether or not the temperature of the adsorbent reaches the predetermined temperature (step 412). Immediately after the start of the recirculation, since the temperature of the adsorbent has not reached the predetermined value (accumulated suction air amount < accumulated suction air amount for judgement), the CPU 101 performs the process as in the above-described step 409 and maintains the closed condition of the flow path A.

Figure 7:
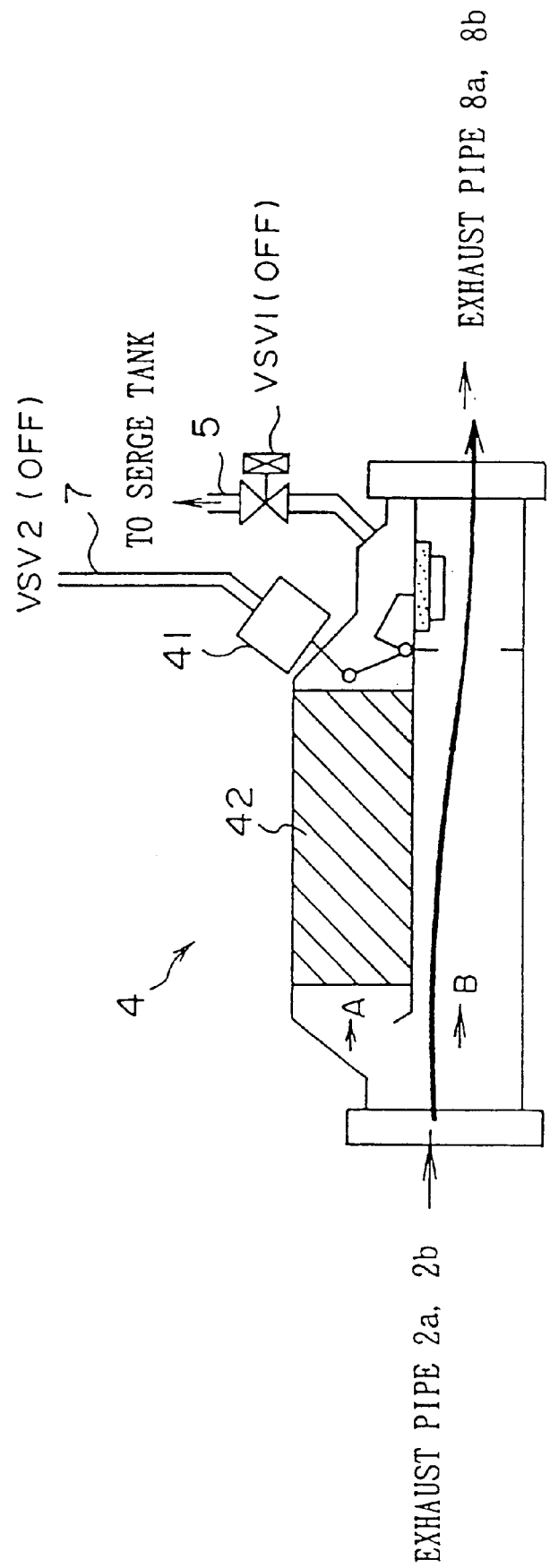
FIG. 7 is a view (3) showing a flow of the exhaust gas within the adsorbent sleeve.

Then, as the CPU 101 repeatedly executes the routine shown in FIG. 4, the accumulated suction air amount reaches the accumulated suction air amount for judgement or more. At this time, the CPU 101 judges that, in step 412, the accumulated suction air amount reaches the accumulated suction air amount for judgement or more; that is, the temperature of the adsorbent has reached the predetermined value (temperature at which the adsorbed hydrocarbon (HC) has been completely separated). Then, the CPU 101 stops the power supply to the first vacuum switching valve VSV1 from the drive circuit 107 and closes the recirculation pipe 5 (step 403). As a result, the exhaust gas that has been purified through the activated catalysts 3a and 3b is discharged to the exhaust pipes 8a and 8b located downstream thereof through the flow path B within the adsorbent 4 as shown in FIG. 7.

After the closure of the recirculation pipe 5, the CPU 101 discriminates whether or not the fuel to be supplied to the engine is stopped (step 414). In the case where the CPU 101 judges that the fuel to be supplied is stopped, the CPU 101 executes the process like that in the step 406, opens the flow path A (closes the flow path B), and at the same time maintains the closed condition of the recirculation pipe 5. In this case, all the exhaust gas discharged from the catalysts 3a and 3b is caused to pass through the flow path A in the same way as shown in FIG. 5. Thus, since adsorbent 42 within the adsorbent sleeve 4 is heated by the large amount of the exhaust gas discharged from the catalysts 3a and 3b, the temperature of the adsorbent rises up to a high temperature for a short period of time. Also, the exhaust gas discharged from the engine 1 kept under the fuel supply interrupt condition has a high oxygen concentration and contains a large amount of non-reactive oxygen even after the catalysts 3a and 3b. Accordingly, due to the temperature rise of the adsorbent 42, the reaction of the adhered materials such as soot adhered to the adsorbent 42 with the non-reactive oxygen contained in the exhaust gas is accelerated so that the materials adhered to the adsorbent 42 are separated.

Also, in the foregoing step 414, if the CPU 101 judges that the engine 1 is kept under the fuel supply condition, the CPU advances to the step 415 and discriminates whether the vehicle is decelerated or not (step 415). For the method of judgement of the deceleration condition, the change rate of the throttle opening degree per unit time is sought from the output signal of the throttle opening degree sensor 109, and it is possible to judge the deceleration condition according to the positive value or negative value of the change rate, for example.

If the CPU 101 judges the deceleration condition in the above-described step 415, the process is advanced to the step 416, and the CPU 101 discriminates whether or not the air/fuel ratio (A/F) of the exhaust gas is in the lean condition referring to the output signal of the air/fuel ratio sensor 111. If the CPU 101 judges that the air/fuel ratio (A/F) of the exhaust gas is in the lean condition, the CPU 101 executes the process as in the above-described step 407, opens the flow path A within the adsorbent sleeve 4 (closes the flow path B) and at the same time closes the recirculation pipe 5. In this case, in the same way as shown in FIG. 5, the exhaust gas introduced into the adsorbent sleeve 4 is discharged to the exhaust pipes 8a and 8b downstream thereof through the flow path A. Thus, the adsorbent 42 within the adsorbent sleeve 4 is heated by the large amount of exhaust gas discharged from the catalysts 3a and 3b rather than the small amount of the exhaust gas like the exhaust gas recirculation, and the adsorbent 42 is heated up to a high temperature for a short period of time. Also, the lean exhaust gas that has been discharged during the deceleration still contains a large amount of non-reactive oxygen even after the passage through the catalysts 3a and 3b. Accordingly, the reaction of the adhered materials such as soot adhered to the adsorbent 42 with the non-reactive oxygen contained in the exhaust gas is accelerated by the temperature rise of the adsorbent 42 so that the materials adhered to the adsorbent 42 are separated.

If the CPU 101 judges that the condition is not in the deceleration condition in the above-described step 415, or the air/fuel ratio (A/F) of the exhaust gas is in the rich condition in the above-described step 416, the CPU 101 advances to the step 409 to keep the closed condition of the flow path A (keep the open condition of the flow path B).

When the engine 1 is at a standstill, in the abovedescribed step 401, the CPU 101 judges that the engine start flag of the RAM 103 is reset and resets the operation time of the engine 1 (step 408). The CPU 101 performs the same process as that in the above-described step 409 and closes the flow path A (opens the flow path B).

Figure 8:
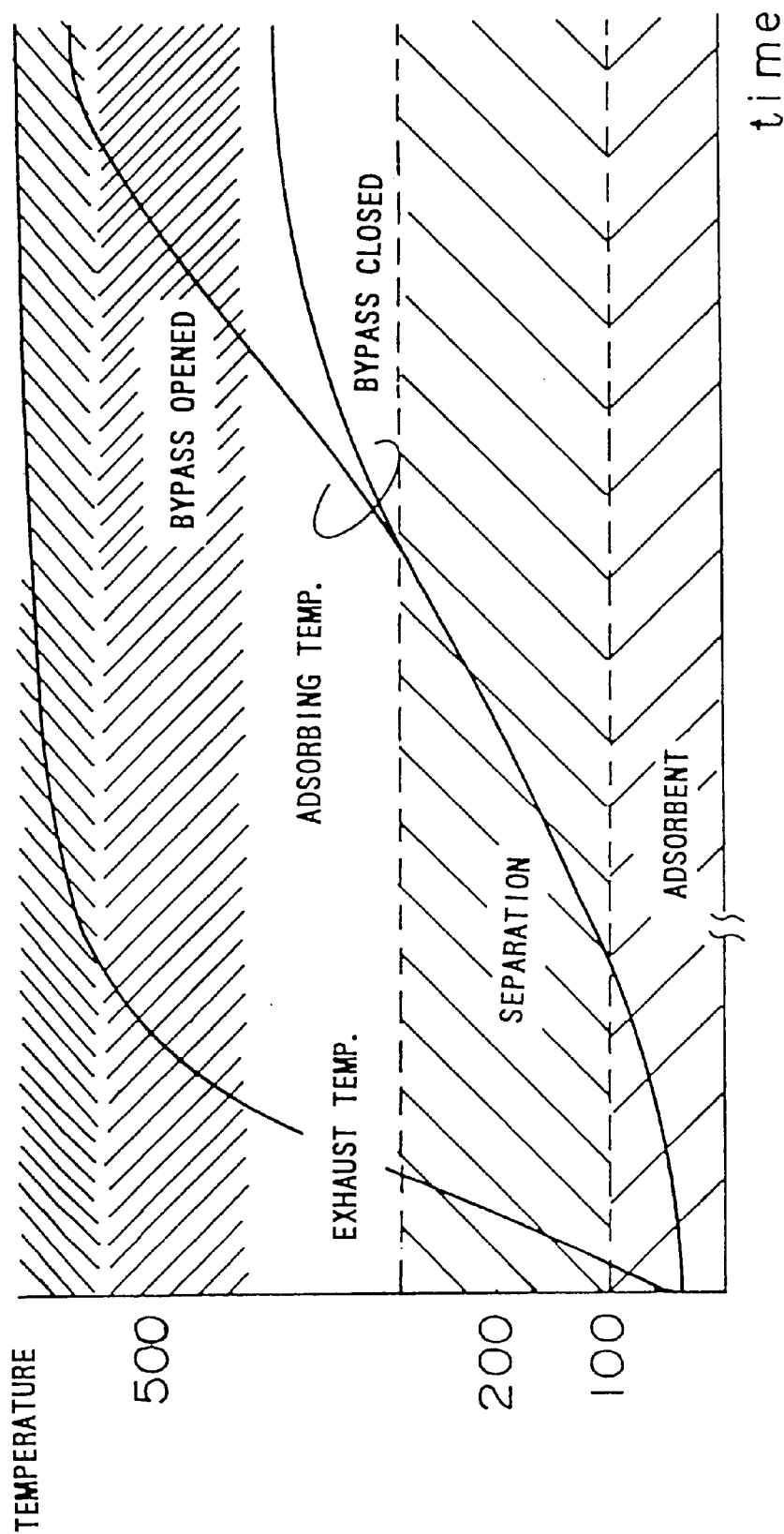
FIG. 8 is a view showing characteristics of the adsorbent.

Now, the characteristics of the adsorbent 42 are shown in FIG. 8. The ordinate axis represents the temperature and the abscissa axis represents the time. When the engine 1 is started in the cold condition, the adsorbent adsorbs the hydrocarbon (HC) contained in the exhaust gas discharged from the catalysts kept under the non-activated condition. In this case, the adsorbent is heated by the exhaust gas. The hydrocarbon (HC) is continuously adsorbed until the temperature rises to the level at which the separation of the hydrocarbon (HC) is started (about 100° C.). Then, when the separation of the hydrocarbon (HC) is started, the adsorbent is heated gradually by the small amount of the exhaust gas for the EGR and is heated to a temperature (300° C. to 400° C.) at which the separation of the hydrocarbon (HC) is completed. In the prior art, since the exhaust gas recirculation is stopped in this stage, the exhaust gas is not caused to flow to the adsorbent and the temperature rise of the adsorbent is almost stopped. In contrast thereto, in the embodiment, after the separation of the hydrocarbon (HC) has been completed, and when predetermined conditions are met (when the oxygen concentration of the exhaust gas is high, for example, in the fuel supply interrupt condition or the deceleration condition and when the air/fuel ratio is in the lean condition), the large amount of exhaust gas is caused to flow through the adsorbent so that the temperature of the adsorbent may rise. Then, when the temperature of the adsorbent rises to 450° C. or more, the adhered materials such as soot adhered to the adsorbent reach the combustible temperature. In this case, the combustion of the adhered materials is accelerated by the non-reactive oxygen contained in the exhaust gas.

In the exhaust purifying apparatus shown in the embodiment, the adhered materials such as soot which could not be well separated in the separation process utilizing the exhaust gas recirculation are burnt, so that the adhered materials may be positively separated away from the adsorbent and it is possible to suppress the degradation of the adsorbent ability of the adsorbent.

Furthermore, in the exhaust purifying apparatus shown in the embodiment, such a system is utilized that, as desired after the exhaust gas recirculation (only removing the soot adhered to the adsorbent), the adsorbent is exposed to the exhaust gas. Accordingly, it is possible to suppress the degradation of the adsorbent due to the exhaust gas to a minimum extent. Also, only in the condition that the engine output is not needed, for example, under the condition that the air/fuel ratio is kept under the lean condition and during the deceleration or the fuel supply interrupt, the system allows the exhaust gas to flow through the adsorbent. Accordingly, when the engine output is needed, the adsorbent is not the resistance against the exhaust gas.

Incidentally, in the embodiment according to the embodiment, such a structure is exemplified that the exhaust gas is recirculated to the engine suction side. It is of course possible to take a structure to recirculate the exhaust gas to the upstream side of the catalysts.

Also, the temperature of the adsorbent 42 is specified by the accumulated suction air amount. It is possible to specify the temperature by using the operation time from the engine start. Also, it is possible to mount the temperature sensor on the adsorbent 42 to directly detect the temperature of the adsorbent 42.

Embodiment 2

Another Embodiment

Figure 10:
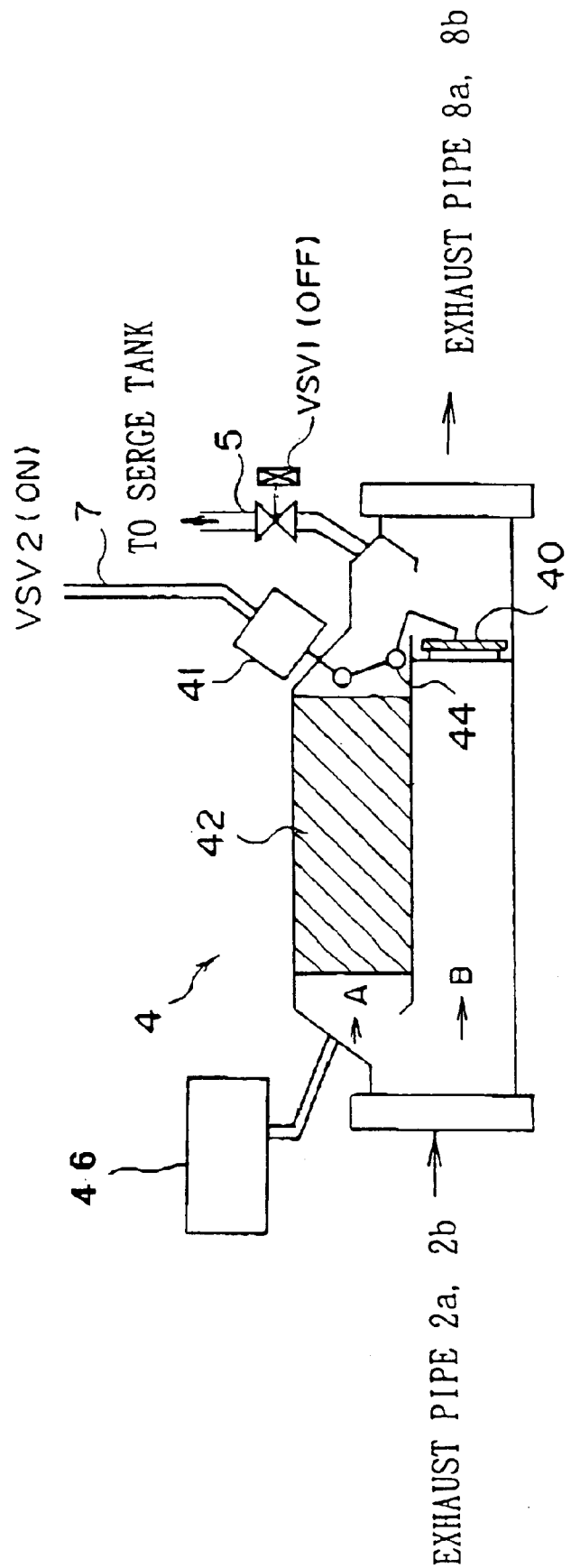
FIG. 10 is a view showing a secondary air supply device for introducing a secondary air into the flow path A of the upstream of the absorbent mounted on the absorbent sleeve.

In the foregoing embodiment, it is exemplified the case where, in order to oxidize the adhered materials such as soot adhered to the adsorbent 42, the exhaust gas in the fuel supply interrupt condition, or during the deceleration and when the air/fuel ratio (A/F) of the exhaust gas is in the lean condition, gas is a utilized. However, as shown in FIG. 10, a second air supply device (for example, an air pump) 46 for introducing the secondary air into the flow path A of the upstream of the absorbent 42 may be mounted on the absorbent sleeve 4, and the secondary air is supplied from this secondary air supply device 46 into the flow path A, thereby the oxygen concentration in the exhaust is forcibly increased.

In this case, the secondary air supply device 46 is operated, after completion of the separation of the hydrocarbon (HC), to introduce the secondary air into the upstream of the absorbent 42, and at the same time, the second vacuum switching valve VSV2 is controlled so that the flow path A within the absorbent sleeve 4 is opened. Thus, it is possible to increase the oxygen concentration of the adsorbent 42 without any affect of the operational condition of the engine. Accordingly, since the time at which the oxygen concentration is increased and the number of the operations may be selected as desired, it is possible to perform the regeneration process of the adsorbent 42 for a short period of time.

Figure 9:
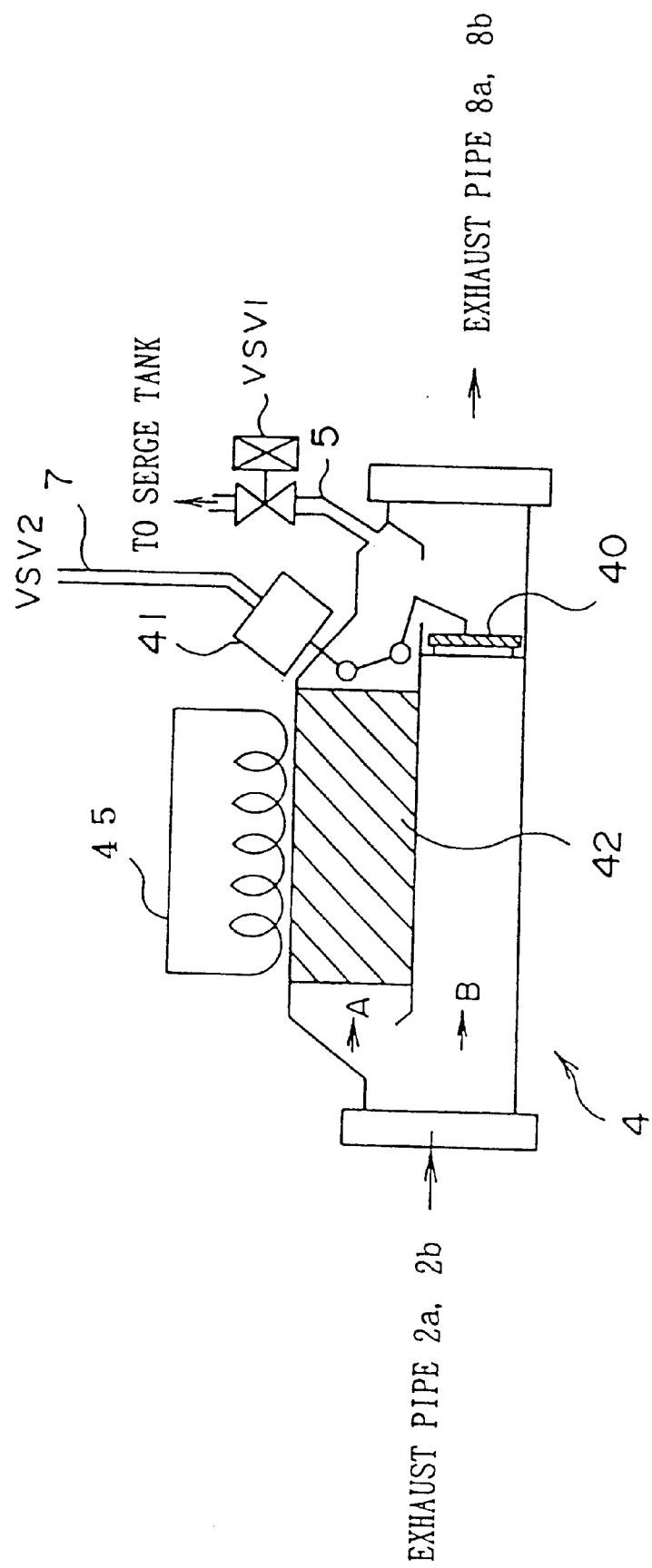
FIG. 9 is a view showing another embodiment of the adsorbent sleeve.

Also, in the foregoing embodiment, the exhaust gas is utilized for heating the adsorbent. However, as shown in FIG. 9, it is possible to provide a heater 45 that may be heated by electric supply in the vicinity of the adsorbent sleeve 4 to thereby forcibly heat the adsorbent 42. In this case, after the completion of the separation process of the hydrocarbon (HC), during the fuel supply interrupt or the deceleration and when the air/fuel ratio (A/F) of the exhaust gas is in the lean condition, the flow path A within the adsorbent sleeve 4 is opened and at the same time the electric supply is effected to the heater 45. It is thus possible to make the overall adsorbent uniform and to heat positively heat the adsorbent.

Furthermore, using both the secondary air introduction and the heater, the materials adhered to the adsorbent 42 may be oxidized at any time as desired.

Also, the heater as the heating means may be disposed in series with the adsorbent or a well known exhaust gas heater catalyst (EHC) may be disposed within the adsorbent.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. An exhaust gas purifying apparatus for an internal combustion engine, comprising:

a path switching means for introducing exhaust gas from the internal combustion engine into at least one of a first exhaust gas path and a second exhaust gas path branched downstream of catalysts;

an adsorbing means disposed in said first exhaust gas path for adsorbing unburnt gas components contained in the exhaust gas;

a recirculating means for recirculating the unburnt gas components separated from said adsorbing means to an upstream side of the catalysts; and a temperature elevating means for elevating a temperature of said adsorbing means after the unburnt gas components separated from said adsorbing means have been recirculated by said recirculating means to a temperature range higher than a temperature range for separating the unburnt gas components from said absorbing means.

2. The exhaust gas purifying apparatus according to claim 1, wherein said temperature elevating means comprises:

an air/fuel ratio discriminating portion for discriminating whether or not an air/fuel ratio of the exhaust gas from the internal combustion engine is higher than a stoichiometric air/fuel ratio; and a controlling portion for controlling said path switching means in order to introduce the exhaust gas from the catalysts into said first exhaust gas path when the air/fuel ratio discriminating portion judges that the air/fuel ratio of the exhaust gas is higher than the stoichiometric air/fuel ratio.

3. The exhaust gas purifying apparatus according to claim 1, wherein said temperature elevating means comprises:

a secondary air supply portion for mixing secondary air with the exhaust gas from the internal combustion engine; and a controlling portion for controlling said path switching means so that the exhaust gas mixed with the secondary air is introduced into said first exhaust gas path.

4. The exhaust gas purifying apparatus according to claim 1, wherein said temperature elevating means comprises a heating portion for heating said adsorbing means.

5. An exhaust gas purifying method for an internal combustion engine, comprising the steps of:

introducing exhaust gas from the internal combustion engine into at least one of two exhaust gas paths branched downstream of catalysts;

adsorbing unburnt gas components contained in the exhaust gas by an adsorbing means disposed in at least one of said exhaust gas paths;

recirculating the unburnt gas components separated from said adsorbing means to an upstream side of said catalysts; and elevating a temperature of said adsorbing means to a temperature range higher than a temperature range for separating the unburnt gas components from said absorbing means, after the unburnt gas components separated from said adsorbing means have been recirculated.

* * * * *

UNITED STATES PATENT AND TRADEMARK OFFICE
CERTIFICATE OF CORRECTION

PATENT NO. : 5,956,947
DATED : September 28, 1999
INVENTOR(S) : Hiroshi Tanaka et al.

It is certified that error appears in the above-identified patent and that said Letters Patent is hereby corrected as shown below:

Abstract,
Line 1, change "regenerate" to -- regenerated --;
Line 4, change "meet" to -- accomplish --.

Column 1,
Line 67, change "degrated" to -- degraded --.
Line 39, change "renders" to -- causes --.

Column 2,
Line 52, before "seperated" change "is" to -- are --.

Column 3,
Line 3, before "into" insert -- goes --.
Line 7, after "air/fuel" insert -- ratio --; change "supervises" to -- monitors --.
Line 41, change "is" to -- are --.
Line 58, change "its" to -- their --.

Column 4,
Line12, change "has" to -- have --.
Line 19, change "path," to -- paths,--.
Line 21 after "gas" change "is" to -- are --.

Column 5,
Line 5, delete "of the".
Line 26, change "emerged" to -- merged --.

Column 8,
Line 47, change "effected" to -- directed --.

Column 10,
Line 20, change "abovedescribed" to -- above-described --.

UNITED STATES PATENT AND TRADEMARK OFFICE
CERTIFICATE OF CORRECTION

PATENT NO.    : 5,956,947
DATED         : September 28, 1999
INVENTOR(S)   : Hiroshi Tanaka et al.

It is certified that error appears in the above-identified patent and that said Letters Patent is hereby corrected as shown below:

Column 11,
Line 7, change " that the" to -- where higher --.
Line 11, change " the engine" to -- higher engine --.
Line 12, change " the resistance" to --resistant --.
Line 19, change "specify" to -- control --.
Line 31, after, "path A" delete "of the".
Line 44, change "affect of" to -- effect on --.
Line 59, change "effected" to -- directed --.
Line 60, before "positively" delete "heat".

Signed and Sealed this

Twenty-first Day of August, 2001

*Attest:*

NICHOLAS P. GODICI
*Attesting Officer*   Acting Director of the United States Patent and Trademark Office